(12) United States Patent
Cutts et al.

(10) Patent No.: US 6,248,207 B1
(45) Date of Patent: Jun. 19, 2001

(54) SEPARATION OF SOLIDS FROM AQUEOUS SUSPENSIONS CONTAINING CELLULOSIC FIBERS AND FINES

(75) Inventors: Paul Kenneth Cutts, West Yorkshire; Matthew James Green, Kent, both of (GB); Bo Gunnar Drehmer, Sundsvall (SE); Inger Viktoria Eriksson, Sundsvall (SE); Hans Olov Johansson, Sundsvall (SE)

(73) Assignees: CIBA Specialty Chemicals Water Treatment Limited, Bradford (GB); SCA Graphic Research AB, Sundsvall (SE)

(*) Notice: Subject to any disclaimer, the term of this patent is extended or adjusted under 35 U.S.C. 154(b) by 0 days.

(21) Appl. No.: 09/254,950

(22) PCT Filed: Oct. 7, 1997

(86) PCT No.: PCT/GB97/02732

§ 371 Date: May 13, 1999

§ 102(e) Date: May 13, 1999

(87) PCT Pub. No.: WO98/15686

PCT Pub. Date: Apr. 16, 1998

(30) Foreign Application Priority Data

Oct. 7, 1996 (GB) .................................................. 9620887

(51) Int. Cl.⁷ .............................. D21H 11/14; D21B 1/08
(52) U.S. Cl. ................................. 162/4; 162/55; 162/189; 162/190; 209/164; 209/728; 210/928
(58) Field of Search ................................. 162/4, 55, 189, 162/190; 209/3, 17, 728, 729

(56) References Cited

FOREIGN PATENT DOCUMENTS

| | | | |
|---|---|---|---|
| 4034054C1 | 10/1990 | (DE) | ................................. D21F/1/66 |
| 4130472A1 | 9/1991 | (DE) | ................................. D21C/5/02 |
| 195 204 94A1 | 6/1995 | (DE) | ................................. D21F/1/66 |
| WO 94/28237 | * 12/1994 | (WO) . | |

OTHER PUBLICATIONS

Dorica J. "Separation . . . Case Study", Tappi J., pp. 109–116, May 1995.*

Tappi Journal, May 1995, vol. 78, No. 5, pp. 109–116, "Separation of Fiber and Ash in Deinking Effluents: A Case Study", Dorica, Joseph et al.

43rd Purdue Industrial Waste Conference Proceedings, 1989, pp. 673–687, "Total Closing of Paper Mills with Reclamation and Deinking Installations", Krofta, Milos et al.

International Search Report.

* cited by examiner

Primary Examiner—Dean T. Nguyen
(74) Attorney, Agent, or Firm—David R. Crichton

(57) ABSTRACT

Cellulosic fines and cellulosic fibers are separated from a suspension containing the fines, the fibers and hydrophobic materials by screening the suspension to remove the fibers, and then subjecting the resultant filtrate to dispersed air flotation in the presence of calcium and generally a separation aid to form an upper Reject fraction in which the hydrophobic material is concentrated and a lower Accept fraction in which the cellulosic fines are concentrated.

19 Claims, 1 Drawing Sheet

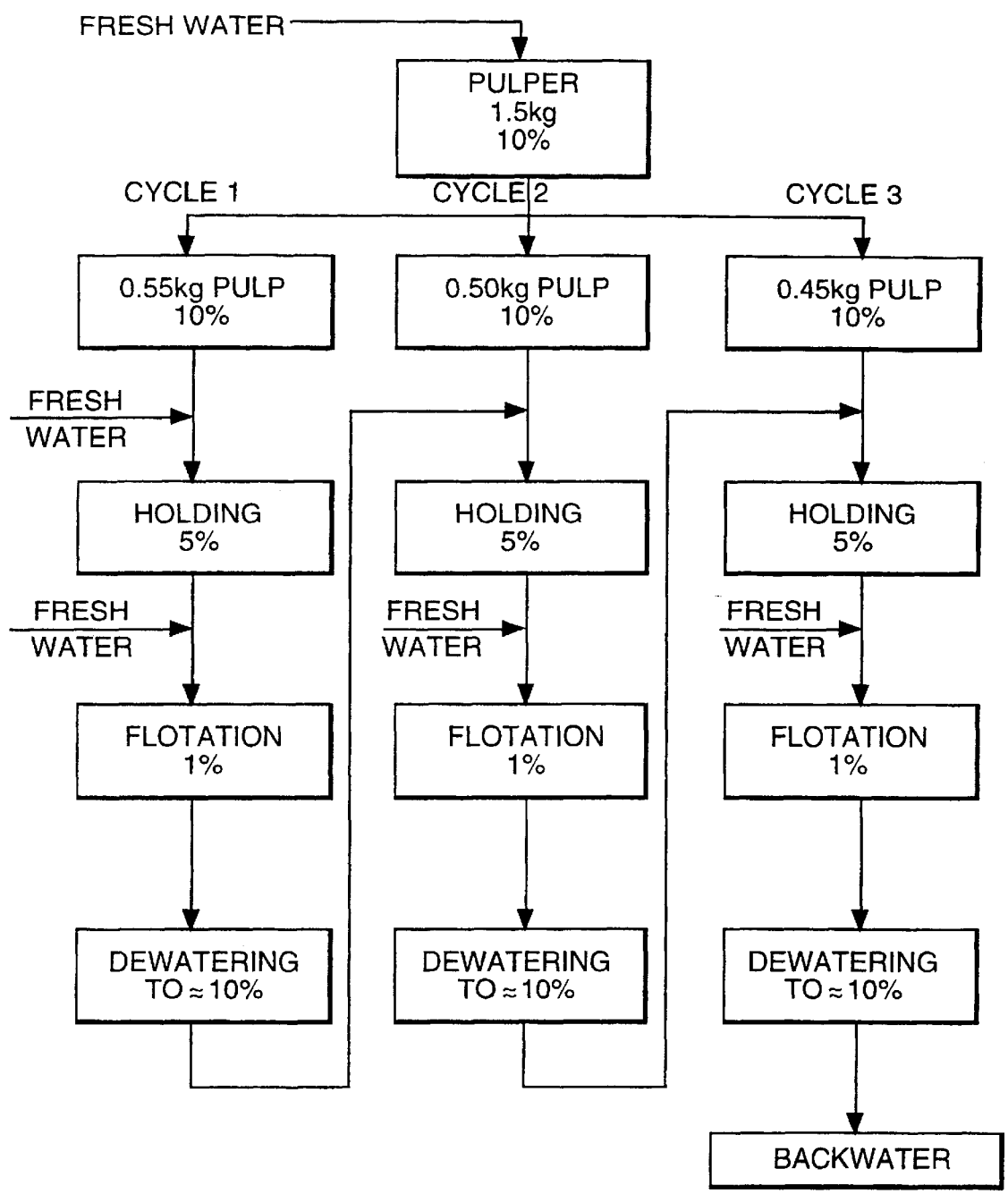

SEPARATION OF SOLIDS FROM AQUEOUS SUSPENSIONS CONTAINING CELLULOSIC FIBERS AND FINES

This invention relates to the selective removal of suspended cellulosic materials from aqueous suspensions containing these together with suspended hydrophobic materials such as filler.

BACKGROUND OF THE INVENTION

It is well known to prepare waste paper for re-use in paper-making processes by subjecting it to de-inking. The waste paper is normally pulped with water in the presence of de-inking chemicals and then the pulp is subjected to a de-inking stage in which ink is separated from the pulp. The de-inking stage may involve for instance flotation and/or washing. Flotation generally takes place in a flotation cell, in which a foam is formed at the surface of the pulp. This foam is removed, since it contains large amounts of the ink. However, this foam may contain some desirable materials, for instance fibres and cellulosic fines. Significant amounts of fibres and cellulosic fines are also often carried through in the waste water which has been used for washing the deinked pulp (backwater).

In general it is well known simply to dispose of the foam from the flotation stage. Backwater is often treated so as to clarify it. That is, solid materials are separated from the backwater to form a sludge. The clarified water can then be recycled to the de-inking process and the sludge sent for disposal. Clarification can be by for instance sedimentation, filtration or dissolved air flotation. All of these processes are designed to remove from the backwater substantially all suspended solids in a non-selective manner.

Thus in such systems any fibres and cellulosic fines which have been carried into the foam or backwater are lost.

It is known to screen backwater before it is subjected to clarification treatment so as to remove long cellulosic fibres. These can then be recycled to the de-inking or paper-making process. The filtrate is then treated as normal to remove all remaining suspended solids. This is often done by dissolved air flotation. Again, substantially all suspended solids are removed in a non-selective manner. It is also known to include flocculating or coagulating chemicals at this stage. These induce agglomeration of the suspended solids into flocs which can then be floated and removed. Systems of this general type are described by Krofta and Wang, in "Total Closing of Paper Mills with Reclamation and De-inking Installations", 43rd Purdue Industrial Waste Conference Proceedings, 10–12 May 1988, pp. 673 to 687 (published 1989). These systems aim only to recover long fibres from backwater. After these have been recovered, the aim of the described system is to clarify and recycle the backwater.

It is also known to clarify paper-making white waters in general by removing fibres using standard solid-liquid separation methods.

In all of the above systems, even those which involve recovery of long fibres, valuable materials are lost, in particular cellulosic fines. Not only are these useful materials lost, but they form part of the foam or sludge which must be disposed of and contribute towards the significant disposal costs (either by landfill or burning) which are incurred by de-inking plants.

Dorica and Simandl, in "Separation of Fibre and Ash in De-inking Effluents: A Case Study", Tappi Journal, Vol. 78, No. 5, pp 109 to 116, May 1995, have attempted to separate useful cellulosic materials from other materials such as clay present in de-inking backwaters. They aim to do this by using modified mechanical systems which include dispersed air flotation and screening. The flotation step is designed to float the fibres to form an upper fraction and to retain clay in the lower fraction. However, from the results given it appears that significant amounts of the fibre content of the suspension treated are lost in the lower, "clay" fraction. Dorica and Simandl also describe various two-stage processes. Those described however involve either two screening steps or a flotation step followed by screening of the floated materials.

The systems described all rely on solely mechanical methods and do not give an efficient separation of cellulosic and hydrophobic materials.

It would be desirable to be able to reduce the costs of waste disposal by re-use of valuable materials, by separating these in an efficient and convenient manner from materials which are not required for re-use.

It would also be desirable to avoid as far as possible the loss of suspended cellulosic materials from waste waters, especially those produced in the course of de-inking processes, and to recover these for re-use in an efficient manner.

DESCRIPTION OF THE DRAWINGS

FIG. 1 is a schematic of a deinking loop.

DETAILED DESCRIPTION OF THE INVENTION

The invention provides a method of separating cellulosic fines and cellulosic fibres from an aqueous suspension which contains cellulosic fibres, cellulosic fines and hydrophobic materials, comprising A) screening the aqueous suspension to remove cellulosic fibres and to provide a filtrate then B) subjecting the filtrate to a dispersed air flotation stage in the presence of a level of calcium ion of at least 50 ppm, preferably at least 100 ppm, and at a pH of at least 6 and preferably in the presence of separation aid comprising one or more of:

(a) fatty acid or salt thereof (b) cationic polymeric separation aid (c) anionic polymeric separation aid (d) amphoteric polymeric separation aid, thereby forming an upper Reject fraction and a lower Accept fraction whereby cellulosic fines concentrate in the Accept fraction hydrophobic material concentrates in the Reject fraction and C) separating the Reject and Accept fractions.

We find that the central feature of the process of the invention is step (B). In this step hydrophobic materials are floated selectively to form the upper Reject fraction. Colloidal materials, if present, are also selectively floated into the Reject fraction. The hydrophobic and colloidal materials include ink, colloidal solids such as starch, partially dissolved cellulose, oils and adhesives, and in particular filler. We find that in de-inking processes in particular filler particles are rendered substantially hydrophobic as they pass through the de-inking and/or washing stages and are thus hydrophobic in the waste water which forms the aqueous suspension of the method of the invention. The invention can however be used to separate filler and other hydrophobic materials from any aqueous suspension in which the filler is substantially hydrophobic.

In step (B) selective separation occurs such that hydrophobic and colloidal materials are predominantly floated into the Reject fraction whilst cellulosic fines are predominantly retained in the Accept fraction. By means of the process of the invention it is possible to achieve very good selectivity. Removal of filler and, in particular, residual ink leaves the cellulosic fines very clean. This means that if desired they can be recycled directly into the deinked pulp for transport to the paper-making process.

The selectivity of this step is unexpected in view of the known action of the various flotation aid components used. Calcium ion is known to have a coagulating effect, whilst the soapy and polymeric materials which are preferably used in the invention tend normally to act as collectors, coagulants or flocculants. It would thus be expected that all of the solid materials suspended in the aqueous liquor would be agglomerated and floated in a non-selective manner. However, this does not occur and in the invention we can achieve high levels of selectivity.

In step (A) the aqueous suspension is screened to remove cellulosic fibres. Screening may be by any suitable method of sorting by size and/or form, for instance by filtration. Fibres screened out in step (A) are normally of length such that they are retained on a screen having hole or slot size of less than 200 $\mu$m or 100 $\mu$m and preferably less than 70 $\mu$m or often 80 $\mu$m. Normally hole size is not more than 100 $\mu$m. Particles of filler, colloidal solids and cellulosic fines are smaller and thus are not retained to any significant extent during screening.

In this step it is possible to screen out as much as 70%, often 75% or 80% or more, even up to 90% or 95% or above, by weight of the cellulosic fibres present in the aqueous suspension.

The solids fraction recovered can also be very rich in cellulosic fibres, for instance having a content of at least 70%, often at least 80 or 90% or even 95% by weight of solids screened out, of cellulosic fibre.

Step (A) produces a solids (fibre) fraction and a liquid phase, which is the remaining aqueous suspension, in this specification termed the filtrate, whichever method is used for screening out the cellulosic fibres. The filtrate passes to step (B).

In step (B) selective removal of hydrophobic and colloidal material is obtained. In this process the filtrate produced in step (A) is subjected to dispersed air flotation (also known as induced air flotation). This process is distinct from dissolved air flotation. In the dispersed air flotation step (B) bubbles of relatively large diameter are produced. These may have size from around 0.1 to 1.0 mm. Any known equipment for dispersed air flotation may be used. In general, known flotation cell systems produce air bubbles of the desired size either by rapid stirring of the filtrate which is being subjected to flotation or otherwise pulling air into the flotation cell, for instance through an air hole. The air may be introduced by suction or pressure.

Generally the presence of turbulence in the flotation cell is desirable during the dispersed air flotation stage.

Various other conditions for the flotation stage (B) are important in the invention, as follows.

The filtrate is at a pH of at least about 6 and is preferably at alkaline pH for instance at least about 9 or 10. Generally it is not more than about 11 or 12. If the aqueous suspension is washing stage backwater or rejected foam from a de-inking process it will normally have a pH of at least 6. If the aqueous suspension does not have appropriate pH this can be provided by the addition of suitable buffer materials, in standard manner.

In flotation stage (B) the content of calcium ion is also important. It must be at least about 50, and preferably at least about 100, ppm calcium ion based on volume of filtrate being subjected to flotation. Often it is at least about 120 ppm, often at least 150 ppm and may be as high as 200 ppm or more. Generally it is not more than about 400 or 500 ppm.

The filtrate may contain sufficient levels of calcium ion as it enters step (B). For instance, it may comprise very hard water or may comprise residual calcium ion from processes to which it has previously been subjected. Generally however the levels of calcium ion are not sufficient to achieve the desired results. In such cases calcium ion is added to the filtrate in step (B), normally before flotation begins, although it may be added before or during step (A). It can be added in the form of any convenient calcium salt, for instance $CaCl_2$. Around 50 to 150 ppm of the calcium ion content is normally derived from added calcium salt, often 70 to 100 ppm, in particular around 90 ppm.

Other polyvalent salts can also be used in these amounts, for instance to provide aluminium, ferric or ferrous ion, instead of or in addition to calcium ion.

The process is greatly improved if a separation aid is included in step B. This may comprise one or more of various types of suitable material.

It may comprise material of class (a), selected from fatty acids and salts thereof. Sulphonated or alkali metal salts of fatty acids can be used. Sodium salts are preferred. We believe that in systems in which a fatty acid or derivative thereof is used as a component of the separation aid, it interacts with calcium ion to form a calcium salt of the fatty acid, which then acts on the suspended solids to aid in giving the desired effects. Thus any salt of fatty acid may be used which will give the corresponding calcium salt in the presence of calcium ion.

Suitable fatty acids for use in acid or salt form include $C_{10-20}$ fatty acids, preferably $C_{12-18}$ and more preferably $C_{16-18}$ fatty acids.

The separation aid may comprise material (b), selected from cationic polymeric materials generally having intrinsic viscosity of not more than 20 dl/g. Any suitable polymeric material may be used, for instance cationised polymeric emulsions. The material may be a naturally occurring cationic polymer or a modified naturally occurring polymer but preferably it is a synthetic polymer which has been formed from ethylenically unsaturated monomer or monomer blend.

The cationic polymeric material may have relatively high intrinsic viscosity of at least about 5 dl/g, often not more than 15 dl/g, for instance 6 or 7 to 10 or 12 dl/g. Polymers having too high an intrinsic viscosity can in some systems give reduced selectively. Preferably the relatively high intrinsic viscosity materials have a relatively low cationic charge density. For instance, if the material is a synthetic polymer produced from a blend of monomers, preferably this blend comprises not more than 70 wt %, preferably 50 wt %, often not more than 30 wt %, cationic monomer.

The cationic polymer is preferably formed from water soluble ethylenically unsaturated monomer or monomer blend. Suitable cationic monomers include dialkylaminoalkyl(meth) acrylates and -acrylamides, as acid addition or, preferably, quaternary ammonium salts, and diallyldialkyl ammonium halides. Preferred (meth) acrylates are di-$C_{1-4}$ alkylaminoethyl (meth) acrylates and preferred (meth) acrylamides are di-$C_{1-4}$ alkylaminopropyl (meth) acrylamides, in particular dimethylaminoethyl (meth) acrylates [DMAE(M)A] and dimethylaminopropyl (meth) acrylamide [DMAP(M)A], as acid addition and, preferably, quaternary ammonium salts. The preferred diallyldialkyl ammonium halide is diallyldimethyl ammonium chloride (DADMAC).

Preferred cationic polymers of relatively high IV are copolymers of the above monomers with non-ionic ethylenically unsaturated monomer. Suitable non-ionic monomers include (meth) acrylamide, in particular acrylamide.

Other cationic polymeric materials which are useful as separation aid (b) are of the lower molecular weight coagulant type and have intrinsic viscosity of not more than about 3 dl/g and preferably have a relatively high cationic charge density. In particular, preferred cationic polymeric materials in this class are formed from water-soluble ethylenically unsaturated monomer or monomer blend in which at least 50 wt %, generally at least 80 wt %, of the monomers are cationic. Polymers in which 100% of the monomers are cationic are preferred.

Although any of the cationic monomers listed above can be used, polydiallyldimethyl ammonium chloride (polyDADMAC) is preferred. Copolymers of DADMAC which contain up to 30 wt % acrylamide are also useful.

The low molecular weight coagulant type cationic polymeric materials preferably have IV below about 2 dl/g, often below 1.5 or 1 dl/g, for instance down to 0.1 to 0.2 dl/g.

Generally the cationic polymeric material is a linear synthetic polymer. However, it is possible to use polymers which have been produced in the presence of cross-linking or branching agent. For instance, the cationic polymer can be of the type described in EP-A-202,780.

The separation aid may also comprise materials (c) selected from anionic polymeric materials generally having intrinsic viscosity of not more than 25 dl/g. The anionic polymeric material may be a natural polymeric material such as a polysaccharide or a modified natural polymeric material. Preferably however it is a synthetic polymer, in particular one formed from water-soluble ethylenically unsaturated monomer or monomer blend.

Anionic polymeric material of low intrinsic viscosity, for instance below 4 dl/g, may be used. Preferably however the intrinsic viscosity is at least about 5, preferably at least 8, for instance from 8 to 12 or 15 dl/g. Preferably the intrinsic viscosity is not especially high, since in some systems this can reduce the selectivity achieved. Preferably then the intrinsic viscosity is not more than 15 or 12 dl/g.

Generally at least 5, 10 or 15 wt % up to 100 wt %, preferably 20 to 80 wt %, of the monomers used to produce the polymer are anionic, with any other monomers being non-ionic.

Preferred anionic monomers are ethylenically unsaturated carboxylic or sulphonic acids, generally as their water-soluble alkali metal salts. Examples are 2-acrylamido-2-methyl propane sulphonic acid (AMPS, US Trade Mark), methacrylic acid and acrylic acid (as sodium or other alkali metal salts). Sodium acrylate is usually preferred.

Suitable water-soluble ethylenically unsaturated non-ionic comonomers include (meth) acrylamide, especially acrylamide.

Preferred anionic polymers are copolymers of acrylamide and, usually, 50 to 80% by weight sodium acrylate. Alternatives include homopolymers of sodium acrylate and copolymers of acrylamide and AMPS, in particular copolymers of AMPS and up to 97 wt %, often up to 95 wt %, (meth) acrylamide.

The synthetic polymers of class (c) are generally substantially linear, although they may be produced in the presence of cross-linking or branching agent.

Suitable separation aids include those of class (d), ampho-teric polymeric materials. These are generally produced from a monomer blend, normally of water-soluble ethylenically unsaturated monomer, comprising 5 to 50 wt % cat-ionic monomer and 5 to 50 wt % anionic monomer, optionally with non-ionic monomer. Either cationic monomer or anionic monomer may be in excess. Suitable cationic, anionic and non-ionic monomers are as discussed above.

All of the above polymeric materials of types (b), (c) and (d) are preferably water-soluble, although they can be emulsions provided the emulsion polymer gives suitable flotation and separation performance.

In this specification intrinsic viscosity is measured by suspended level viscometer in buffered pH 7 1M NaCl at 25° C.

Blends of all of the above materials can be used as components of the separation aid. Specific amounts and combinations of material are chosen for the particular suspension to be treated by flotation so as to obtain the best selectivity results.

In some systems it is desirable to use materials from class (a) as the sole component of the separation aid, or to use materials from classes (b), (c) and (d) or combinations thereof as the separation aid. In particular, use of components (b) and/or (c) is preferred.

It is often preferred however to use a combination of components from class (a) with components from any or all of classes (b), (c) and (d), in particular from classes (b) and/or (c). In such systems it is particularly unexpected that selectivity is obtained rather than non-selective agglomeration and flotation of all solid materials, since in these systems a collector type material, material (a), is being used in combination with a flocculant or coagulant type material.

Materials (a) are often used in amounts of from 50 to 150 ppm based on volume of filtrate, preferably 80 to 120 ppm, for instance around 100 ppm.

Materials (b), (c) and (d) are often used in amounts of from 0.1 to 15 ppm, often below 10 ppm, preferably 0.3 to 7 ppm, more preferably 0.5 to 5 ppm, based on volume of filtrate.

In the invention aqueous suspensions containing significant amounts of cellulosic fibre are treated by subjecting them to step (A) and then step (B). It is possible to treat such suspensions using step (B) only, although use of step (A) before step (B) is preferred. Aqueous suspensions which do not contain significant amounts of cellulosic fibre can be treated using steps (B) and (C) only.

The Reject and Accept fractions are separated in step C, but if convenient this separation can be regarded as part of step B. This separation can be done in any standard manner, for instance by skimming the upper foam which forms the Reject fraction. This material comprises filler and other hydrophobic materials and can then be disposed of, for instance by burning or to landfill.

The resultant Accept fraction then contains a high proportion of cellulosic fines as suspended solids. The entire Accept fraction may be recycled to the relevant process, for instance a de-inking process. Preferably however the cellulosic fines are separated from the Accept fraction, for instance in a subsequent step. This may be done by any suitable solid-liquid separation method, for instance filtration, sedimentation or centrifuging. The preferred method is flotation, usually dissolved air flotation, if necessary in the presence of coagulating or flocculating agents.

The cellulosic fines collected are often very clean and can be reused as desired. For instance, if the aqueous suspension is a waste water produced by a de-inking process, the fines can be incorporated into the de-inked pulp and sent to the paper making process or recycled directly to a paper making process. Alternatively, in particular for less clean batches of cellulosic fines, they may be recycled to the de-inking process.

In this specification, cellulosic fines are insoluble cellulosic materials derived from cellulosic fibres, for instance extremely short cellulosic fibres having a length usually below 200 μm or 100 μm and preferably below about 70 or 80 μm but generally above 10 or 20 μm.

The method of the invention allows highly efficient separation of cellulosic fines from hydrophobic and any colloidal materials. In particular, in step (B) the Reject fraction preferably contains at least 55%, more preferably at least 75% or 80%, of the hydrophobic and any colloidal materials, in particular filler, originally present in the filtrate. It is even possible in the method of the invention to recover in step (B) 90 or 95% and even up to 98% of the hydrophobic and any colloidal content of the filtrate.

The invention also allows highly selective separation, in that the Reject fraction has a high content of hydrophobic materials such as filler and a low content of cellulosic fines. In particular, the solids content of the Reject fraction is made up of at least 60%, preferably at least 75%, filler.

The highly selective nature of the method of the invention also allows efficient recovery of cellulosic fines. It is possible to carry out methods such that the Accept fraction contains at least 60%, preferably at least 70% of the cellulosic fines originally present in the filtrate. Preferably also the selectivity for cellulosic fines in step (B) is high. In particular the solids content of the Accept fraction is at least 60%, often at least 70 or 80% and even up to 90% or more, cellulosic fines, with a corresponding low content of hydrophobics and colloidal materials.

The method of the invention may be used for the treatment of any aqueous suspension containing cellulosic fibres, fines and hydrophobic materials. Suitable suspensions are some paper-making white waters and mill wastes.

It is preferred however that the aqueous suspension is a waste water from a de-inking process. In such a de-inking process waste paper is provided and pulped with water and de-inking chemicals. It is then subjected to a de-inking stage, which comprises flotation de-inking and/or washing de-inking. Flotation de-inking produces a foam at the surface of the pulp which is skimmed off and sent for disposal. The aqueous suspension used in the method of the invention may be produced by adding water to and reconstituting such a foam. Preferably however the aqueous suspension is or is derived from spent wash water. This wash water contains some cellulosic fibres and significant amounts of cellulosic fines.

In a de-inking process recovered cellulosic fibres and fines can be recycled to the de-inked pulp if they are especially clean or to the de-inking process.

The following is an example of the invention.

EXAMPLE

The tests described below are carried out on a laboratory prepared simulated back-water from the washing stage of a de-inking process.

The following raw materials were used:
60% old newsprint (ONP) consisting of minimum 7 different offset printed newspapers,
40% old magazines (OMG) consisting of 20% supercalendered (SC) paper and 20% light weight coated (LWC) paper
Age of the paper:
newsprint 1–3 months SC and LWC max 12 months
Storage:
In black plastic bags at room temperature.
Back-water was produced from a simulated de-inking loop. The water simulating the de-inking loop was prepared according to the scheme shown in FIG. 1.

The standard pulping and de-inking condition included in the water preparation process were as follows:
Raw material:
pieces of size about 2×2 cm$^2$, cut in a guillotine.

| | | |
|---|---|---|
| Pulping | Alternative 1. pulper, capacity 1.5 kg | Lamort laboratory |
| | Alternative 2. pulper, capcity 100 g | Hobart laboratory |
| | consistency | 10% |
| | temperature | 45–50° C. |
| | time | 20 min (Hobart 5 min speed 1 + 20 min speed 2). |
| | Chemicals | |
| | NaOH | 1.0% (active on dry fibre) |
| | Na-silicate | 2.0% (active on dry fibre) |
| | collector SERFAX DB | 0.8% to pulper + 2.0% to the 2nd cycle and 0.2% to the 3rd cycle. |
| | $H_2O_2$ | 1.0% (active on dry fibre) |
| | $CaCl_2$ | 390 mg/l (ca 20 ° dH, 141 mg/l $Ca^{2+}$) |
| | pH in pulper | 10.0–10.5 |
| Holding time | consistency | 5% |
| | temperature | 45–50° C. |
| | time | 30 min |
| Flotation De-Inking | Alternative 1. | Swemac laboratory cell |
| | Alternative 2. | Voith laboratory cell |
| | Alternative 3. | Degussa laboratory cell |
| | pH at start | 8.5–9.0 |
| | consistency | 1% |
| | temperature | 45–50° C. |
| | time | 15 min |

Hot tap water corrected to 390 mg/l $CaCl_2$ (141 mg $Ca^{2+}$) was used for dilution of the pulp to 5% before holding and further to 1% before flotation in the first cycle.

The dewatering apparatus was a type of enlarged "Draining Jar", the volume of which was about 15 liters. The bottom wire was a Gemini plus 8 shaft duplex wire of polyester, supplied by UNAFORM LTD. The mesh size for efficient particle removal corresponds to the 200 mesh (76 μm) standard wire in the Britt Dynamic Drainage Jar. The stirring speed was about 100 rpm and at the end of the dewatering the pulp was pressed to make the amount of water removed match the amount of water needed in the following loop.

A typical composition of back-water produced in this way was:

| | |
|---|---|
| Solids | 2.5 g/l |
| Fibre | 0.15 g/l |
| Filler | 50% of defibred water |
| Cellulosic Fines | 50% of defibred water |

Step (A), screening, was carried out by passing the back-water through a laboratory TRENNER device, available from Meri Anlagentechnik, Germany, to produce a filtrate.

Step (B) : the filtrate produced in step (A) was subjected to dispersed air flotation in a Denver laboratory flotation cell or a Voith laboratory flotation cell.

The flotation resulted in formation of an upper Reject fraction which was removed and a lower Accept fraction which was retained.

Step (C): the Accept fraction was subjected to dissolved air flotation using a laboratory dissolved air flotation cell available from Meri Anlagentechnik, Germany.

In step (B), various materials were used as flotation aid. The filtrate entering stage (B) had a calcium ion content of approximately 80 ppm. The flotation aids used were as follows:

E: calcium carbonate.

F: sodium salt of $C_{16-18}$ fatty acid.

G: polydiallyldimethyl ammonium chloride, intrinsic viscosity below 1 dl/g.

H: copolymer of 75 wt % acrylamide and 25 wt % dimethylaminoethyl acrylate quaternary ammonium salt, intrinsic viscosity 7 dl/g.

J: copolymer of 30 wt % acrylamide and 70 wt % sodium acrylate, intrinsic viscosity 8 dl/g.

Various combinations of these materials were used, as follows:

Run 1: 90 ppm E, 100 ppm F, 1 ppm J
Run 2: 90 ppm E, 100 ppm F, 5 ppm G
Run 3: 90 ppm E, 5 ppm G
Run 4: 90 ppm E, 100 ppm F, 0.5 ppm H
Run 5: 90 ppm E, 100 ppm F, 0.5 ppm J
Run 6: 90 ppm E, 100 ppm F
Run 7: 90 ppm E, 100 ppm F, 1 ppm H.

Results are given below in Table 1 for step (B) Filler selectivity is the weight percentage of filler in the solids content of the Reject fraction. Filler yield is the weight percentage of total filler in the filtrate which is in the Reject fraction.

TABLE 1

| Run No. | % Filler Selectivity | % Filler Yield |
|---------|----------------------|----------------|
| 1 | 81.9 | 69.3 |
| 2 | 82.4 | 59.2 |
| 3 | 77.4 | 67.3 |
| 4 | 82.2 | 71.4 |
| 5 | 72.9 | 96.1 |
| 6 | 73.4 | 79.4 |
| 7 | 72.8 | 100 |

In the processes carried out in the examples the recovery of fibre in step (A) was generally at least 82% (ie at least 82 wt % of the total fibre in the back-water was recovered).

In step (C) over 70% of the cellulosic fines present in the Accept fraction were recovered to give a cellulosic fraction of which around 97% by weight of solids was made up of cellulosic fines.

The above results demonstrate the surprisingly efficient and selective separation which can be achieved by the use of the method of the invention, in particular incorporating selective dispersed air flotation step (B) The amounts of materials to be dumped are greatly reduced, thus reducing cost, and loss of valuable cellulosic materials is alleviated.

What is claimed is:

1. A method of separating cellulosic fines and cellulosic fibres from an aqueous suspension which contains cellulosic fibres, cellulosic fines and hydrophobic materials, comprising A) screening the aqueous suspension to remove cellulosic fibres and to provide a filtrate then
   B) subjecting the filtrate to a dispersed air flotation stage in the presence of calcium ion in an amount of at least 50 ppm and at a pH of at least 6 thereby forming an upper Reject fraction and a lower Accept fraction whereby cellulosic fines concentrate in the Accept fraction and hydrophobic material concentrates in the Reject fraction and
   C) separating the Reject and Accept fractions.

2. A method according to claim 1 in which the cellulosic fines are separated from the Accept fraction in step (C).

3. A method according to claim 2 in which cellulosic fines are separated from the Accept fraction by dissolved air flotation.

4. A method according to any preceding claim in which the hydrophobic materials comprise filler.

5. A method according to claim 1 in which the Reject fraction contains at least 55% of the hydrophobic materials present in the filtrate.

6. A method according to claim 1 in which the Accept fraction contains at least 60% of the cellulosic fines present in the filtrate.

7. A method according to claim 1 in which the cellulosic fines obtained from step (A) and the cellulosic materials obtained from step (c) make up at least 60% by weight of the total suspended cellulosic content of the aqueous suspension.

8. A method according to claim 1 which is a process of de-inking waste paper and which comprises de-inking the waste paper to form a deinked pulp and then washing the deinked pulp and producing waste wash water, in which the waste wash water forms the aqueous suspension.

9. A method according to claim 8 in which the suspension is a paper-making white water, a paper-making mill waste or a deinking waste and in which the cellulosic fines are separated from the Accept fraction in step (C) and in which the cellulosic fibres removed in step (A) and the cellulosic fines removed in step (C) are recycled to the paper-making process or to the deinked pulp.

10. A process according to claim 1 in which the flotation in step B is conducted in the presence of separation aid comprising one or more of:
   (a) fatty acid or salt thereof
   (b) cationic polymeric separation aid
   (c) anionic polymeric separation aid
   (d) amphoteric polymeric separation aid.

11. A method according to claim 10 in which the separation aid comprises one or more of:
   a) fatty acid or alkali metal salt thereof
   b) cationic polymeric material having intrinsic viscosity of 3 dl/g or below and formed from monomers comprising at least 50 wt % cationic monomers
   c) cationic polymeric material having intrinsic viscosity of at least 5 dl/g and formed from monomers comprising less than 50 wt % cationic monomers
   d) anionic polymeric material having intrinsic viscosity of at least 4 dl/g.

12. A method according to claim 10 or claim 11 in which the separation aid comprises a sodium salt of a fatty acid in an amount of from 50 to 150 ppm based on volume of filtrate.

13. A method according to claim 11 in which the separation aid comprises material (a) in combination with any or all of materials (b), (c) and (d).

14. A method according to claim 11 in which the separation aid comprises any of the materials (b), (c) and (d) in a total amount of polymeric material of from 0.1 to 10 ppm based on volume of filtrate.

15. A method according to any of claims 10 to 14 in which the separation aid is selected from the following combinations:

(i) sodium salt of fatty acid in an amount of 50 to 150 ppm and copolymer of acrylamide and ethylenically unsaturated anionic monomer having intrinsic viscosity of at least 5 dl/g in an amount of from 0.1 to 10 ppm, (ii) sodium salt of fatty acid in an amount of 50 to 150 ppm and copolymer of more than 50 wt % acrylamide and less than 50 wt % ethylenically unsaturated cationic monomer having an intrinsic viscosity of at least 5 dl/g in an amount of 0.1 to 10 ppm, (iii) sodium salt of fatty acid in an amount of 50 to 150 ppm and polydiallyldimethyl ammonium chloride of intrinsic viscosity 2 dl/g or below in an amount of 0.1 to 10 ppm.

16. A process according to any of claims 10 to 15 in which the amount of calcium in step B is at least 100 ppm.

17. A process according to claim 16 in which the cellulosic fines have a length below 80 $\mu$m.

18. A method according to claim 1 in which the flotation stage is carried out in the presence of a level of calcium ion of at least 150 ppm.

19. A method according to claim 1 in which the amount of calcium ion is provided by adding calcium salt to the filtrate.

* * * * *